Figure 1:
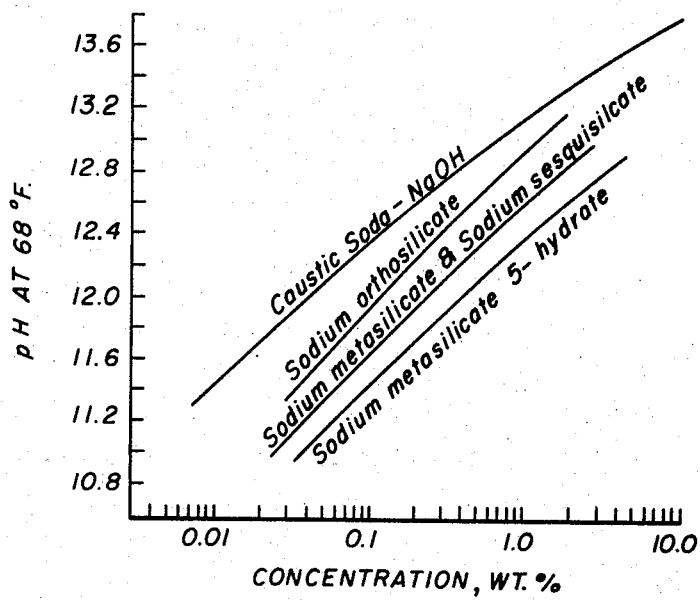

United States Patent [19]

Sarem

[11] 3,871,452

[45] Mar. 18, 1975

[54] MOBILITY CONTROLLED CAUSTIC FLOODING PROCESS FOR RESERVOIRS CONTAINING DISSOLVED DIVALENT METAL CATIONS

[75] Inventor: Amir M. Sarem, Yorba Linda, Calif.

[73] Assignee: Union Oil Company of California, Los Angeles, Calif.

[22] Filed: Mar. 26, 1974

[21] Appl. No.: 454,866

Related U.S. Application Data

[63] Continuation-in-part of Ser. No. 284,345, Aug. 28, 1972, Pat. No. 3,805,893.

[52] U.S. Cl. .............................. 166/270, 166/273
[51] Int. Cl. ............................................. E21b 43/22
[58] Field of Search .................. 166/270, 273–275, 166/292, 300

[56] References Cited
UNITED STATES PATENTS

| | | | |
|---|---|---|---|
| 2,402,588 | 6/1946 | Andresen | 166/270 |
| 2,747,670 | 5/1956 | King et al. | 166/270 |
| 3,202,214 | 8/1965 | McLaughlin, Jr. | 166/292 |
| 3,285,338 | 11/1966 | Boston | 166/273 X |
| 3,342,262 | 9/1967 | King et al. | 166/292 |
| 3,392,782 | 7/1968 | Ferrell et al. | 166/270 X |
| 3,396,790 | 8/1968 | Eaton | 166/273 X |
| 3,414,053 | 12/1968 | Trieber et al. | 166/273 |
| 3,530,937 | 9/1970 | Bernard | 166/273 X |
| 3,656,550 | 4/1972 | Wagner, Jr. et al. | 166/270 |
| 3,658,131 | 4/1972 | Biles | 166/273 X |

*Primary Examiner*—Stephen J. Novosad
*Attorney, Agent, or Firm*—Dean Sanford; Richard C. Hartman; Lannas S. Henderson

[57] ABSTRACT

A process for recovering oil from subterranean reservoirs having connate water containing dissolved divalent metal cations in which small slugs of (1) aqueous alkali metal hydroxide solution, (2) a dilute aqueous alkaline alkali metal silicate solution, and (3) a dilute aqueous solution of an agent that reacts with the alkali metal silicate to form a gelatinous precipitate are alternatively injected into the reservoir through one or more injection wells. A small slug of water is injected between successive slugs of the reactant solutions to separate the reactants during injection. Also, alkali metal carbonate can be incorporated into the aqueous alkali metal hydroxide solution, or aqueous alkali metal carbonate solution can be injected immediately preceding the alkali metal hydroxide solution.

18 Claims, 2 Drawing Figures

MOBILITY CONTROLLED CAUSTIC FLOODING PROCESS FOR RESERVOIRS CONTAINING DISSOLVED DIVALENT METAL CATIONS

This is a continuation-in-part of application Ser. No. 284,345 filed Aug. 28, 1972, and now U.S. Pat. No. 3,805,893.

This invention relates to the recovery of petroleum from subterranean reservoirs, and more particularly to the recovery of viscous oil from heterogeneous reservoirs having connate water containing dissolved divalent metal cations.

Because substantial amounts of oil remain unrecovered at the completion of normal primary recovery operations, various secondary methods of recovering additional quantities of oil have been proposed. These processes generally consist of the injection of one or more fluids into the reservoir to drive oil towards spaced production wells from where it is recovered. However, the processes differ markedly in their essential steps, and in the results obtained and costs involved. It has long been recognized that the overall recovery efficiency of a secondary recovery operation is a function of the displacement efficiency and the areal and vertical sweep efficiencies, and can be expressed by the relationship $$R = D \times S \times C$$

wherein

R is the overall recovery efficiency expressed as a decimal fraction;

D is the displacement efficiency expressed as a decimal fraction;

S is the areal sweep efficiency expressed as a decimal fraction; and

C is the vertical sweep efficiency expressed as a decimal fraction.

It is known that displacement efficiency is increased as the interfacial tension between the connate oil and the displacing fluid is reduced, and that in the truly miscible displacement processes displacement efficiencies of 90 to 100 percent can be obtained. It is also known that the interfacial tension between many crude oils and water is pH dependent and that these interfacial tensions can be markedly lowered by raising the pH of the flood water injected to drive the oil to the producing wells. Thus, in certain instances the so-called "caustic flooding" processes can be effective in increasing the displacement efficiency.

However, even though displacement efficiency can be beneficially affected by flooding with high pH flood water such as an aqueous solution of sodium hydroxide, the overall recovery of the process is usually undesirably low because of the low areal and vertical sweep efficiencies, particularly in heterogeneous reservoirs or where the reservoir oil is viscous. This loss in efficiency is generally attributable to the poor mobility ratio existing between the connate oil and the flood water, which typically results in early breakthrough of flood water into the producing wells and rapidly increasing produced water/oil ratios which often necessitate abandonment of the recovery operation even though substantial oil remains unrecovered. Although these problems can to some extent be mitigated by adding thickening agents to the flood water to increase its viscosity to reduce the difference in mobility between the flood water and the oil, and by selectively plugging the water channels in a separate plugging step, water channelling nevertheless remains a problem, particularly in the recovery of viscous oils from heterogeneous reservoirs.

My copending application Ser. No. 284,345, now U.S. Pat. No. 3,805,893, discloses an improved caustic flooding process for flooding heterogeneous reservoirs wherein small slugs of a dilute aqueous alkaline alkali metal silicate solution and a dilute aqueous solution of an agent that reacts with the alkali metal silicate to form a gelatinous precipitate are alternately injected into the reservoir through one or more injection wells, and oil is recovered from one or more spaced production wells. A small slug of water is injected between successive slugs of the reactant solutions to separate the reactants during injection. The high pH alkali metal silicate solution contacts crude petroleum to form an emulsion in situ. This emulsion first reduces the mobility of water, as does the subsequent precipitate formed by the reaction of the alkali metal silicate and the gel forming agent.

However, while this process is effective in increasing the recovery of oil in many reservoirs, it appears to be less effective in reservoirs having connate water containing dissolved divalent cations. It has been found that the reduction of interfacial tension between the reservoir oil and water is much less where the water contains dissolved divalent cations, and that these higher interfacial tensions result in reduced oil recovery. The loss in effectiveness of the process when applied to reservoirs having connate water containing dissolved divalent metal ions is believed attributable to the fact that a portion of the saponifiable constituents of the reservoir oil react with the divalent ions to form soaps having reduced water solubility, and which exhibit lower surface activities than the monovalent soaps formed by reaction of the saponifiable materials with sodium hydroxide. Thus, need exists for an improved caustic flooding process having an increased recovery efficiency, and particularly for a process that can be used to economically recover viscous oil from heterogeneous reservoirs.

Accordingly, a principal object of this invention is to provide an improved process for the secondary recovery of oil from subterranean reservoirs having connate water containing dissolved divalent cations.

Another object of the invention is to provide an improved process for the secondary recovery of viscous oil from subterranean reservoirs having connate water containing dissolved divalent cations.

Still another object of the invention is to provide an improved process for the secondary recovery of oil from heterogeneous subterranean reservoirs having connate water containing dissolved divalent cations.

A yet further object of the invention is to provide an improved caustic flooding process for reservoirs having connate water containing dissolved divalent cations.

Other objects and advantages of the invention will be apparent from the following description.

Briefly, this invention contemplates a process for the recovery of oil from subterranean petroleum reservoirs having connate water containing dissolved divalent metal cations in which small slugs of (1) aqueous alkali metal hydroxide solution, (2) a dilute aqueous alkaline alkali metal silicate solution, and (3) a dilute aqueous solution of an agent that reacts with the alkali metal silicate to form a gelatinous precipitate are alternately injected into the reservoir through one or more injection wells. A small slug of water is injected between successive slugs of the reactant solutions to separate the reactants during injection. Also, alkali metal carbonate can be incorporated into the aqueous alkali metal hydroxide solution, or aqueous alkali metal carbonate solution can be injected immediately preceding the alkali metal hydroxide solution.

Crude petroleum is known to contain varying amounts of saponifiable materials such as petroleum acids which react with alkaline materials to form soaps that reduce the interfacial tension between the crude petroleum and water. The petroleum acids found in any particular crude petroleum can include various carboxylic acids and phenolic acids. Saponification of these acids forms surface active agents that reduce the interfacial tension between the crude petroleum and water. The amount of these saponifiable materials in a crude petroleum and their effect upon the surface active properties of the system can be characterized by the variation of the interfacial tension of the oil-water system as a function of pH. The interfacial tension of a typical crude petroleum-water system at low pH is usually about 20 to 40 dynes/cm. Those crude oils having significantly high contents of saponifiable materials are characterized by reduced interfacial tension at high pH. The method of this invention is particularly applicable to the recovery of crude petroleum that exhibits an interfacial tension with water at a high pH of 5 dynes/cm or less, and more particularly to crude petroleum that exhibits an interfacial tension of 2 dynes/cm or less, and preferably less than 1 dyne/cm.

Also, it is well-known that high viscosity crude petroleum is less amenable to recovery by waterflooding than the lower viscosity oils. While the method of this invention can be efficaciously employed to recover low viscosity crude petroleum, it has particular application in the recovery of crude petroleum exhibiting a viscosity above that of the flood water under reservoir conditions of temperature and more particularly above about 5 centipoises at reservoir conditions.

While the method of this invention is particularly adapted for recovery of oil from heterogeneous reservoirs, as a practical matter, most petroleum reservoirs exhibit some heterogeneity and thus, the overall recovery efficiency of the displacement process is improved in most naturally occurring petroleum reservoirs by treatment with the process of this invention. By heterogeneity, it is meant that the reservoir is comprised of stratified layers of varying permeability, or that it contains fractures, cracks, fissures, streaks, vuggs, or zones of varying permeability that cause an injected flooding medium to advance through the reservoir nonuniformly. Thus, the formations that are particularly amenable to treatment by the method of this invention are those formations that have strata or zones of different permeabilities, and particularly formations having strata varying more than about 50 millidarcies in permeability or which are otherwise structurally faulted to the extent that the injected flooding media does not advance through the formation at a substantially uniform rate along the entire flood front, but which instead are susceptible to channelling of the flood water to the producing well.

Many reservoirs contain connate water in which divalent metal cations are dissolved, such as alkaline earth metal cations, and particularly calcium, magnesium and barium cations. These connate waters also typically contain large quantities of monovalent metal cations, such as the cations of the alkali metal series, and particularly sodium cations. The connate water also contains equilibrium quantities of various anions, such as chloride and bicarbonate anions.

The injection of aqueous sodium hydroxide solution into the reservoir converts bicarbonate anion present in the water to carbonate anion by the reaction:

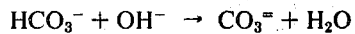

which occurs at a pH of about 10. The carbonate anion formed by this reaction then reacts with the divalent metal cations, and particularly the calcium and barium cations to form calcium and barium carbonates by the reactions:

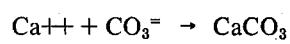

and

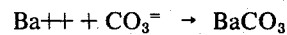

which precipitate as finely divided insoluble solids. The magnesium cations dissolved in the connate water react with hydroxyl anion to form magnesium hydroxide by the reactant:

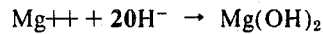

which is also precipitated from solution.

Where the connate water contains less bicarbonate than is required to form the amount of carbonate required to stoichiometrically react with the divalent metal cations, additional water-soluble carbonate, such as alkali metal carbonate, can be added in amounts necessary to precipitate the excess barium and calcium cations. In this manner, the divalent metal cations in the connate water, and particularly barium, calcium and magnesium cations, can be converted to insoluble precipitants. Thus, the deleterious cations are rendered inactive and hence, do not adversely affect the reduction in interfacial tension between the reservoir oil and water obtained by the process.

Figure 2:
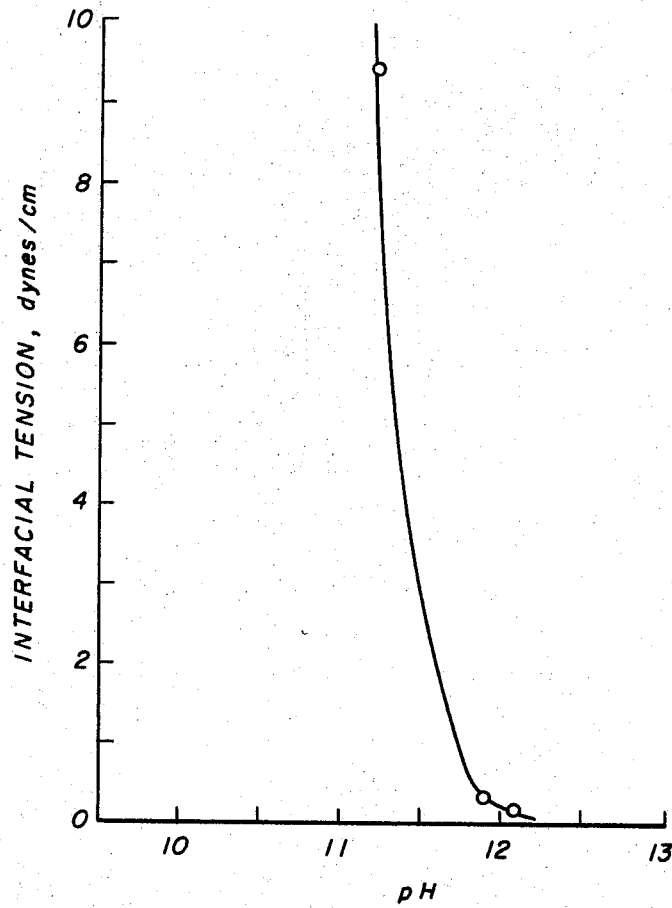

The invention is further described by reference to the appended drawings, wherein:

FIG. 1 is a graph illustrating the variation in the pH of aqueous solutions of various slkaline sodium silicates and sodium hydroxide as a function of the concentration of the alkaline material; and FIG. 2 is a graph illustrating the variation in the interfacial tension of a crude petroleum-water system with pH wherein the crude petroleum contains saponifiable petroleum acids.

The method of this invention is practiced by alternately injecting successive small slugs of (1) aqueous alkali metal hydroxide solution, (2) a dilute aqueous alkaline alkali metal silicate solution, and (3) a dilute aqueous solution of an agent that reacts with the alkali metal silicate to form a gelatinous precipitate, the reactive agent solutions being separated by small slugs of water. The water injected between successive slugs of the reactant solutions these slugs in the well and in the formation immediately adjacent to the well to prevent premature precipitation that might restrict injectivity. The water used in the spacer slug should not react to any appreciable extent with either the alkaline alkali metal silicate or with the other reactive agent to form solid precipitates. On injection into the reservoir, these reactant solutions enter the more permeable channels and eventually become admixed whereupon they react to form a solid precipitate that tends to reduce the permeability of those strata and divert the subsequently injected fluids to other strata. It is postulated that the dilute reactant solutions do not completely plug the permeable strata such as do many of the previously known plugging treatments, but instead effect a permeability reduction tending to continually redistribute the injected fluids so long as the injection process is continued. However, despite any uncertainty in the exact mechanism by which the process operates, it has nevertheless been demonstrated that the process of this invention is effective in increasing oil recovery, and particularly the recovery of relatively viscous oil from heterogeneous reservoirs.

The aqueous alkali metal hydroxide solution is a 0.1 to 10 weight percent solution of an alkali metal hydroxide, such as a sodium or potassium hydroxide. A 0.5 to 2 weight percent aqueous solution of sodium hydroxide is preferred. Also, spent caustic recovered from the caustic treatment of petroleum products to remove acidic constituents can be employed in the alkali metal hydroxide injection step. The spent caustic is employed at higher concentration to provide the hydroxyl ion concentration required to convert bicarbonate to carbonate.

Where the bicarbonate anion content of the connate water is not sufficient to produce carbonate anion in an amount required to precipitate the calcium and barium cations in the water, alkali metal carbonate can be incorporated into the aqueous alkali metal hydroxide solution. Alternatively, a small slug of aqueous alkali metal carbonate solution can be injected immediately preceding the aqueous alkali metal hydroxide solution. Any water-soluble alkali metal carbonate can be employed, with sodium and potassium carbonate being preferred, and sodium carbonate being especially preferred.

The alkali metal carbonate is employed in an amount at least stoichiometrically equivalent to the excess calcium and barium cations in the connate water, and typically about 1 to 10 weight percent of alkali metal carbonate is incorporated into the aqueous alkali metal carbonate solution or injected as a separate aqueous solution.

The alkaline alkali metal silicate employed in the practice of this invention is an alkali metal silicate having a molar ratio of $M_2O/SiO_2$ of 1 and above, wherein M is an alkali metal atom, such as sodium, potassium, lithium, cesium and rubidium, exemplary of which are alkali metal orthosilicate, alkali metal metasilicate, alkali metal metasilicate pentahydrate, and alkali metal sequisilicate. Particular agents useful in the practice of the invention include sodium and potassium orthosilicate, sodium and potassium metasilicate, sodium and potassium metasilicate pentahydrate, and sodium and potassium sequisilicate. The pH of aqueous solutions containing various concentrations of alkaline sodium silicates are shown in FIG. 1. These alkaline sodium silicates generally provide lower pH solutions than equal weight concentration solutions of sodium hydroxide, but nevertheless, provide high pH solutions useful in reducing the interfacial tension of many crude petroleum-water systems. Sodium orthosilicate is a particularly preferred alkaline alkali metal silicate because of its relatively high pH.

In practicing the invention, the variation in interfacial tension between the crude petroleum in the reservoir to be treated and water as a function of pH is first determined. If the interfacial tension is significantly lowered in alkaline systems, i.e., the interfacial tension can be lowered to less than about 5 dynes/cm, and preferably to less than about 1 dynes/cm by pH adjustment, the pH required to obtain the desired interfacial tension is determined. The concentration of alkaline alkali metal silicate required to provide this pH is determined from FIG. 1. Accordingly, it is within the scope of this invention to employ a concentration of alkaline alkali metal silicate effective to reduce the interfacial tension between the petroleum and water to less than about 5 dynes/cm, and preferably to less than about 2 dynes/cm, and most preferably to less than 1 dyne/cm. With most crude oils containing a significant quantity of saponifiable materials, interfacial tension reduction can be obtained by the addition of about 0.01 to 0.8 weight percent alkaline alkali metal silicate, and preferably about 0.05 to 0.3 weight percent.

The alkaline alkali metal silicates used in the practice of this invention are available in solid form, and the respective alkaline alkali metal silicate solutions can be prepared by dissolving an appropriate quantity of the alkaline alkali metal silicate in water. However, in many cases it is more convenient and less costly to prepare the alkaline alkali metal silicate by adding caustic to an aqueous solution of a low-alkalinity alkali metal silicate having a $M_2O/SiO_2$ ratio of less than 1.

A wide variety of reagents can be employed to react with the alkaline alkali metal silicate to form the mobility adjusting precipitate, inclusive of which are acids and acid precursors such as chlorine, sulfur dioxide, sulfur trioxide; water-soluble salts of bivalent metals such as the halide and nitrate salts of iron, aluminum, calcium, cobalt, nickel, copper, mercury, silver, lead, chromium, zinc, cadmium and magnesium; and water-soluble ammonium salts. A preferred agent for reaction with the alkaline alkali metal silicate is calcium chloride.

Preferably, approximately the same volumetric quantities of each aqueous reactant solution are injected in each injection cycle, with the concentration of the water-soluble agent that reacts with the alkaline alkali metal silicate being adjusted to provide sufficient agent to stoichiometrically react with the silicate.

Each slug of reactant solution is injected at conventional flood water injection rates such as rates of about 100 to 2,000 barrels per day per well for a period of about 1 hour to about 7 days, and preferably for a period of about 4 hours to 1 day. The water slug injected intermediate the slugs of reactive solutions can be injected in smaller volume. The following is a typical injection cycle:

| Slug | Time Broad Range | Preferred Range |
|---|---|---|
| Alkali metal hydroxide solution | 1 hour to 7 days | 2 hours to 1 day |
| Alkaline alkali metal silicate solution | 1 hour to 7 days | 4 hours to 1 day |
| Water | 1 hour to 1 day | 1 to 8 hours |
| Aqueous solution of reactant | 1 hour to 7 days | 4 hours to 1 day |
| water | 1 hour to 1 day | 1 to 8 hours |

Where alkali metal carbonate is to be injected as a separate aqueous solution, it is injected immediately preceding the alkali metal hydroxide solution for a period of 1 hour to 7 days, and preferably for a period of 2 hours to 1 day.

Also, where field operations require it, the concentration of chemicals in the various solutions can be increased so that the chemical injections can be completed in a single 8 hour shift, with water being injected during the remaining 16 hours. The injected water will mix with the chemicals in the reservoir to provide chemical solutions of the desired concentrations.

It has been found in some instances that the injection pressure increases during the alkaline alkali metal silicate solution injection step, and then decreases to its original value during the remaining injection steps of that cycle, rising again upon the next injection of alkaline alkali metal silicate solution. Thus, in some instances the slug injection times must be sufficiently short to prevent excessive injection pressures.

In a preferred mode of practicing the invention to recover oil from a subterranean reservoir, an aqueous solution of sodium orthosilicate is prepared having a sodium orthosilicate concentration selected to provide a pH sufficient to reduce the interfacial tension of the oil-water system to less than 5 dynes/cm, and preferably to a value of less than 2 dynes/cm. An aqueous solution containing 0.1 to 10 weight percent of alkali metal hydroxide and optionally 1 to 10 weight percent of alkali metal carbonate is injected into the reservoir through an injection well for a period of about 2 hours to 1 day. Alternatively, this solution is preceded by the injection of an aqueous solution containing 1 to 10 weight percent of alkali metal carbonate for a period of about 2 hours to 1 day. The sodium orthosilicate solution is injected for a period of about 4 hours to 1 day, followed by water injection for about 1 hour to 8 hours, then by a slug of an aqueous solution containing a stoichiometric quantity of a second reactant such as calcium chloride substantially equal in volume to said slug of sodium orthosilicate solution, and then by the injection of water for about 1 hour to 8 hours. This cycle is repeated throughout the flooding operation, and oil and other produced fluids are recovered from a spaced production well. While the mobility-controlled caustic treatment can be followed by conventional water drive, it has been found in some instances that the subsequently injected flood water soon breaks through to the producing wells. Hence, it is preferred to maintain the above-described chemical injections for substantially the entire recovery operation.

This invention is further illustrated by the following examples which are illustrative of specific modes of practicing the invention and are not intended as limiting the scope of the invention as defined by the appended claims.

EXAMPLE 1

This example illustrates the deleterious effect of divalent cations on the interfacial tension between reservoir oil and water at various pH values. A Canadian crude oil is employed in these tests. The interfacial tension is measured between the oil and caustic solutions prepared by dissolving sodium hydroxide in distilled water and in an oil field brine having the following composition:

|  | ppm |
|---|---|
| $HCO_3^-$ | 335 |
| $CO_3^=$ | 0 |
| $Cl^-$ | 49,800 |
| $Na^+$ | 25,000 |
| $Mg^{++}$ | 913 |
| $K^+$ | 540 |
| $Ca^{++}$ | 2,144 |
| $Ba^{++}$ | 89 |
| TDS | 90,800 |
| pH | 7.1 |

A solution of 500 ppm of sodium hydroxide in distilled water exhibited a pH of 12. The interfacial tension between the oil and this water is less than 1 dyne/cm.

Addition of 500 ppm of sodium hydroxide to the brine only increased the pH to 9.8, and 5,300 ppm of sodium hydroxide is required to obtain a pH of 12. However, the interfacial tension between the oil and the brine at pH 12 is only about 16 dynes/cm.

EXAMPLE 2

These tests demonstrate the effectiveness of treatment of a water containing dissolved calcium cations with sodium hydroxide and sodium carbonate.

To one liter of a solution containing 0.0125 moles/liter of calcium hydroxide (equivalent to 500 ppm of calcium cation) is added 0.025 moles of sodium carbonate dissolved in 5 ml of water. A milky precipitate is formed. After standing 24 hours, the supernatant liquid is withdrawn, filtered through a 2–5 micron filter paper, and analyzed for calcium. The treated solution contains 1.9 ppm of calcium.

A second test employs a one liter solution containing 0.0125 moles/liter of calcium chloride (equivalent to 500 ppm of calcium cation). To this solution is added 0.025 moles of sodium hydroxide and 0.025 moles of sodium carbonate dissolved in 5 ml of water. A milky precipitate is formed. After standing 24 hours, the supernatent liquid is withdrawn, filtered through a 2–5 micron filter paper, and analyzed for calcium. The treated solution contains 0.7 ppm of calcium.

EXAMPLE 3

An aqueous alkaline sodium orthosilicate solution is prepared by admixing 0.958 parts by weight of a commercial low alkalinity sodium silicate solution containing 8.9 weight percent $Na_2O$ and 28.7 weight percent $SiO_2$ ($Na_2O/SiO_2$ weight ratio of 0.31) marketed by the Philadelphia Quartz Company under the trademark PQ Sodium Silicate N, with 1.35 parts by weight of 50 weight percent sodium hydroxide solution. The resulting alkaline sodium orthosilicate solution is diluted with water to provide a dilute aqueous solution having a sodium orthosilicate concentration of about 0.06 weight percent.

EXAMPLE 4

The method of this invention is demonstrated by a laboratory flood of a reservoir model. The model consists of alternate thin layers of fine and coarse beads having different wettabilities, and is designed to simulate the channelling characteristics of a heterogeneous reservoir. The ratio of the highest to the lowest permeabilities is estimated to be 50:1.

The model is saturated with a produced oil field brine having the analysis reported in Example 1.

After saturation with the field brine, the model is desaturated with produced crude petroleum and water flooded at a rate of 5 feet per day until a producing water/oil ratio of 50 is reached. Only 14 percent of the oil is recovered by the water flood.

Upon completion of the water flood, the following chemicals are injected in the indicated sequence:

| Step | Material | Concentration, Weight Percent | Volume Injected Pore Volume |
|---|---|---|---|
| 1 | Na$_2$CO$_3$ Solution | 5 | 0.14 |
| 2 | Spent Caustic | 20 | 0.14 |
| 3 | Sodium Metasilicate Solution(1) | 5 | 0.14 |
| 4 | Fresh water | — | 0.03 |
| 5 | Produced oil field brine(2) | — | 1.45 |

(1) Prepared by dissolving a sodium metasilicate marketed by Philadelphia Quartz Company under the trademark Metso 66A in water.
(2) The divalent ions in the produced water react with the sodium metasilicate to form a solid precipitate.

This injection sequence is designed to represent the quantities of material injected in a typical field application, but does not necessarily represent the concentrations of the various chemical solutions or the cyclic injection technique. An additional 30 percent of the oil-in-place in the reservoir is recovered.

The above injection sequence is repeated for two additional sequences with additional recoveries of 4 and 1 percent of the oil-in-place, respectively. The oil recoveries are summarized as follows:

| Sequence | Oil Recovery % of Oil-in-Place | Accumulative Oil Recovery % of Oil-in-Place |
|---|---|---|
| Waterflood | 14 | 14 |
| 1 | 30 | 44 |
| 2 | 4 | 48 |
| 3 | 1 | 49 |

EXAMPLE 5

This example illustrates the practice of the invention in an oil recovery operation in a typical petroleum reservoir having connate water containing dissolved divalent metal cations.

The variation in the interfacial tension between the produced oil and distilled water adjusted to various pH levels by the addition of sodium hydroxide is determined. These data for a typical Canadian crude petroleum is illustrated in FIG. 2. Reduction of the interfacial tension to a value of less than 1 dyne/cm can be obtained at a pH of about 11.7. It can be assumed that the variation in the interfacial tension between the oil and brine treated to precipitate the divalent cations at various pH levels will be essentially the same as that exhibited by the oil and distilled water. From FIG. 1 it is determined that a 0.06 weight percent solution of sodium orthosilicate is required to obtain this pH. The sodium orthosilicate is prepared substantially as described in Example 3.

The recovery operation is carried out by alternately injecting (1) an aqueous 5 weight percent solution of sodium carbonate, (2) an aqueous 1 weight percent solution of sodium hydroxide, (3) an aqueous 0.06 weight percent solution of sodium orthosilicate, (4) water, (5) an aqueous solution containing 0.035 weight percent of calcium chloride, and (6) water. Injection pressures increase during the sodium orthosilicate injection step, and decrease during the subsequent water and calcium chloride injection steps, even though injection rates are maintained substantially constant. The injection cycle time is adjusted periodically to avoid excessive pressure rises. The following is a typical injection cycle:

| Step | Material Injected | Hours, Injection time |
|---|---|---|
| 1 | Sodium carbonate solution | 3 |
| 2 | Sodium hydroxide solution | 3 |
| 3 | Sodium orthosilicate solution | 8 |
| 4 | Water | 1 |
| 5 | Calcium chloride solution | 8 |
| 6 | Water | 1 |

EXAMPLE 6

This example illustrates another mode of practicing the method of this invention in which the chemicals are added at higher concentrations so that the chemical injections can be completed during a single 8 hour period, and produced brine containing divalent cations is injected to react with the sodium orthosilicate. The brine has substantially the same composition as that employed in Example 1, and the sodium orthosilicate is prepared by the technique of Example 3. The following injection sequence is employed.

| Step | Material Injected | Conc. Wt. % | Volume Injected, Bbls./Well | Injection Time, Hours |
|---|---|---|---|---|
| 1 | Fresh Water | — | 10.4 | 1 |
| 2 | Sodium carbonate solution | 5 | 20.8 | 2 |
| 3 | Sodium hydroxide(1) | 1 | 20.8 | 2 |
| 4 | Sodium orthosilicate | 5 | 20.8 | 2 |
| 5 | Fresh water | — | 10.4 | 1 |
| 6 | Brine | — | 167 | 16 |

(1) An equivalent amount of spent caustic may be substituted for the sodium hydroxide.

Various embodiments and modifications of this invention have been described in the foregoing description and examples, and further modifications will be apparent to those skilled in the art. Such modifications are included within the scope of this invention as defined by the following claims.

Having now described the invention, I claim:

1. A process for recovering petroleum from subterranean reservoirs having connate water containing dissolved divalent metal cations and penetrated by one or more injection wells and at least one production well spaced apart in the reservoir, which comprises injecting through at least one of said injection wells and into said reservoir small slugs of (1) aqueous alkali metal hydroxide solution, (2) a dilute aqueous solution of an alkaline alkali metal silicate having a molar ratio of $M_2O/SiO_2$ of 1 or above wherein M is an alkali metal atom, (3) water, (4) a dilute aqueous solution of a water-soluble material that reacts with the alkaline alkali metal silicate to form a precipitate, and (5) water; repeating steps 1 through 5 a plurality of times; and recovering petroleum from said production well.

2. The process defined in claim 1 wherein said petroleum in said reservoir is of the type having reduced interfacial tension with water at high pH, and wherein the concentration of alkaline alkali metal silicate is sufficient to reduce the interfacial tension to less than about 5 dynes/cm.

3. The process defined in claim 1 wherein said petroleum in said reservoir is a viscous petroleum having a viscosity above about 5 centipoises at reservoir conditions of temperature and pressure.

4. The process defined in claim 1 wherein said reservoir is a heterogeneous reservoir having strata of different permeabilities varying by more than about 50 millidarcies.

5. The process defined in claim 1 wherein alkali metal carbonate is incorporated into the aqueous alkali metal hydroxide solution.

6. The process defined in claim 1 including the step of injecting aqueous alkali metal carbonate solution immediately predeeding the alkali metal hydroxide solution.

7. A process for recovering petroleum of the type that exhibits decreased interfacial tension with water at high pH from a subterranean reservoir having connate water containing dissolved divalent metal cations and penetrated by one or more injection wells and at least one production well spaced apart in the reservoir, which comprises:
  1. sequentially injecting through at least one of said injection wells a series of small slugs of (a) aqueous alkali metal hydroxide solution, (b) a dilute aqueous solution containing an amount of an alkaline alkali metal silicate having a molar ratio of $M_2O/SiO_2$ of 1 or above wherein M is an alkali metal atom sufficient to reduce the interfacial tension between said petroleum and water to less than about 5 dynes/cm, (c) water, (d) a dilute aqueous solution containing approximately a stoichiometric quantity of a water-soluble material that reacts with the alkaline alkali metal silicate to form a precipitate, and (e) water;
  2. repeating the injection cycle defined in step 1 a plurality of times; and
  3. simultaneously therewith recovering petroleum from said production well.

8. The process defined in claim 7 wherein said aqueous alkali metal hydroxide solution is a 0.1 to 10 weight percent solution of an alkali metal hydroxide.

9. The process defined in claim 8 wherein said alkali metal hydroxide is sodium hydroxide or potassium hydroxide.

10. The process defined in claim 7 wherein said aqueous alkali metal hydroxide solution is a spent caustic solution.

11. The process defined in claim 7 wherein 1 to 10 weight percent of alkali metal carbonate is incorporated into the aqueous alkali metal hydroxide solution.

12. The process defined in claim 11 wherein said alkali metal carbonate is sodium carbonate or potassium carbonate.

13. The process defined in claim 7 including the step of injecting an aqueous 1 to 10 weight percent solution of alkali metal carbonate immediately preceding the alkali metal hydroxide solution.

14. The process defined in claim 13 wherein said alkali metal carbonate is sodium carbonate or potassium carbonate.

15. The process defined in claim 7 wherein said alkaline alkali metal silicate is sodium or potassium orthosilicate, sodium or potassium metasilicate, sodium or potassium metasilicate pentahydrate, or sodium or potassium sesquisilicate.

16. The process defined in claim 7 wherein said material that reacts with said alkali metal silicate is a water-soluble salt of a divalent metal.

17. The process defined in claim 7 wherein said aqueous alkali metal hydroxide solution, said aqueous alkaline alkali metal silicate solution, and said aqueous reactant solution are injected in each cycle for a period of about 1 hour to about 7 days, and said water slugs are each injected for a period of about 1 hour to about 1 day.

18. A process for recovering petroleum of the type that exhibits decreased interfacial tension with water at high pH from a subterranean reservoir having connate water containing dissolved divalent metal cations and penetrated by one or more injection wells and at least one production well spaced apart in the reservoir, which comprises:
  1. injecting the following sequence of aqueous fluids through said injection well and into said reservoir at normal water injection rates:
    a. an aqueous 1 to 10 weight percent solution of sodium carbonate, said solution being injected for a period of 1 hour to 7 days,
    b. an aqueous 0.1 to 10 weight percent solution of sodium hydroxide or an aqueous spent caustic solution, said solution being injected for a period of 1 hour to 7 days,
    c. a dilute aqueous solution containing an amount of sodium orthosilicate between about 0.01 and 0.08 weight percent sufficient to reduce the interfacial tension between said petroleum and water to less than 2 dynes/cm., said solution being injected for a period of 1 hour to 7 days,
    d. water for a period of 1 hour to 1 day,
    e. a dilute aqueous calcium chloride solution containing a concentration of calcium chloride approximately equivalent to that required to stoichiometrically react with said sodium orthosilicate, said solution being injected for a period approximately equal to the sodium orthosilicate solution injection period, and
    f. water for a period of about 1 hour to 1 day;
  2. repeating the injection sequence of step 1 a plurality of times; and
  3. simultaneously therewith recovering petroleum from said production well.

* * * * *